I. BOLMER.
Tree Protector.
No. 40,235.
Patented Oct 13, 1863.
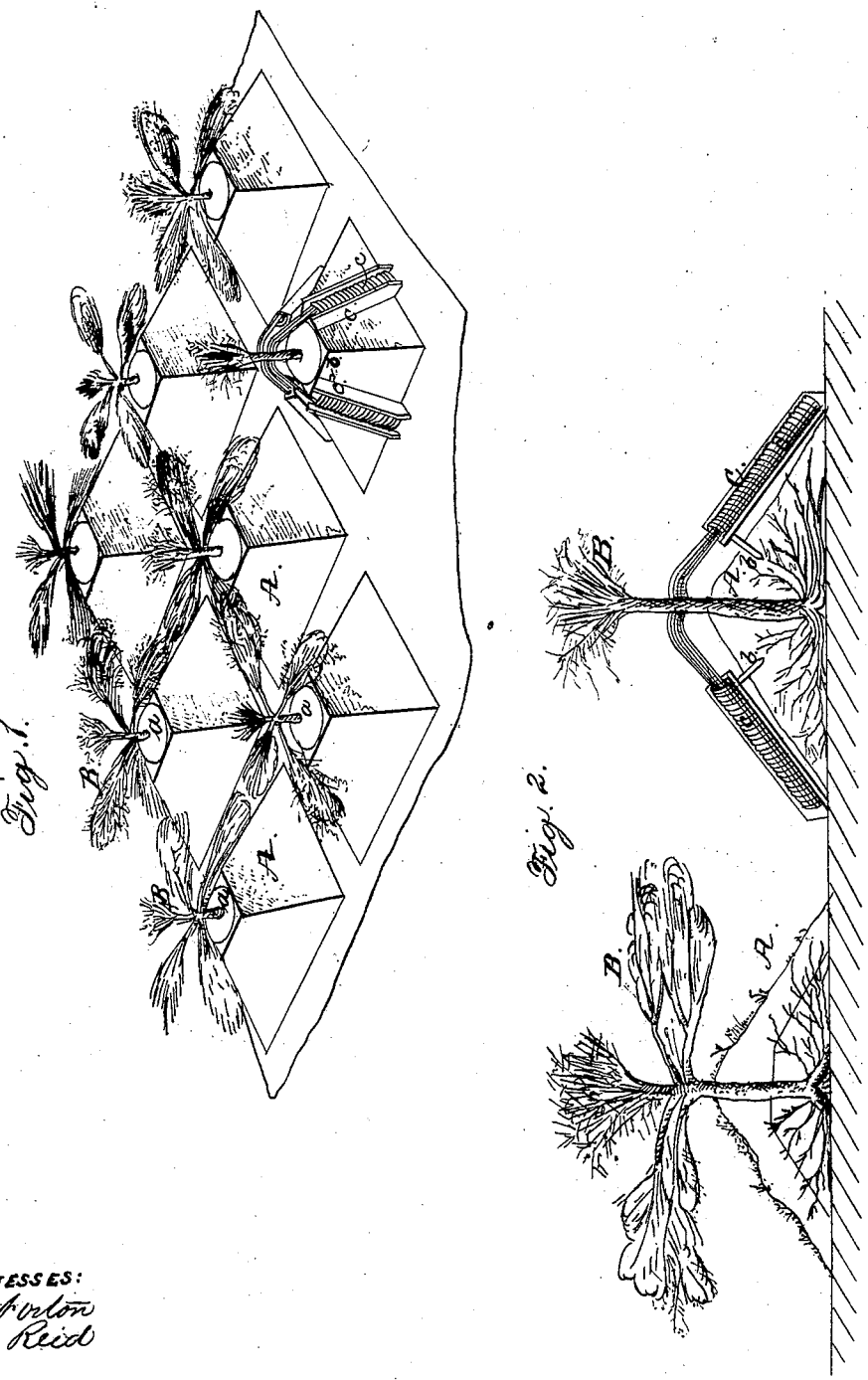
WITNESSES:

UNITED STATES PATENT OFFICE.

ISAAC BOLMER, OF FRANKLIN, OHIO.

PROCESS FOR TREATING FRUIT-TREES.

Specification forming part of Letters Patent No. 40,235, dated October 13, 1863.

*To all whom it may concern:*

Be it known that I, ISAAC BOLMER, of Franklin, in the county of Warren and State of Ohio, have invented a new and useful Improvement in the Treatment of Fruit-Trees; and I do hereby declare the following to be a full, clear, and exact description of the same, reference being had to the accompanying drawings and letters of reference marked thereon, forming part of this specification.

My invention relates to the preparation of the surface of the ground around the trees, in combination with the use of boxes of a particular construction appropriately placed to receive the limbs in the fall of the year and allow them to be covered and protected from the cold and wet; also from the influence of the sun in the early spring until such time as they may be safely uncovered and allowed to vegetate.

In order that others skilled in the art to which my invention relates may understand and employ the same, I will proceed to describe it in detail, referring to the accompanying drawings, in which my improvements are illustrated.

Figure 1 is a perspective view of an orchard of fruit-trees. Fig. 2 is a vertical section of two trees in the different states in which they appear, one as it appears in winter or early spring, protected by the casing of the limbs in boxes, and the other when the limbs are released and covered with foliage.

In planting an orchard of trees I set them sixteen feet apart each way, and, instead of digging a hole and inserting the roots therein, I set them on the surface of the ground and throw up a sufficient amount of the surrounding earth to cover them, say, one or two feet deep. The next season I remove the upper branches of the trees down to within three and a half to four and a half feet from the ground, and then plow between the rows, throwing the earth each way from the center toward the trees, and with the aid of a shovel, if necessary, forming square mounds around each tree, which, when finished, should reach to within a few inches of the first limbs. I have in some instances plowed only one way through the trees, throwing up the earth in ridges in place of mounds; but I prefer the plan first described. After the mounds are formed the trees are trimmed from year to year by removing all the principal central and upgrowing branches, allowing only the lower lateral branches to be developed. This prepares the tree or causes it to develop in a manner appropriate for the treatment which it is afterward to receive. When the tree is sufficiently mature to begin to yield fruit, or, rather, the fall before a fruiting season, the lower branches, which have been allowed to grow, are carefully gathered into three or four, or more, clusters or clumps and gently pressed into boxes arranged around appropriately on the sloping sides of the mounds, as will be hereinafter described. I am in the habit of covering the sides of the mounds with a mulch to prevent the growth of grass and weeds; but care must be taken not to extend the mulch up around the bodies of the trees, as it affords a harbor for mice, which, if afforded access and protection, will gnaw the bark and destroy the trees.

Referring now to the accompanying drawings, A A, &c., represent the mounds, from the upper part of each of which trees B B, &c., are represented. Around the base of the mounds the earth is left level, forming narrow walks, serving also as trenches for the surface-water from the mounds. Decayed or worm-eaten fruit, as it falls from the tree, rolls down into these trenches, and is there tramped into the ground, and in wet seasons covered with water, by which every vestige of insect life is destroyed. As it is from insects protected through the winter in decayed fruit and propagated the following season that the principal injury to the crop is sustained, this means of effectually destroying them in the intervening season is almost a guarantee against the ravages of insects the following year.

*a* represents the portion of the mound to be left bare while the other parts are mulched, as has been mentioned. In the sections, Fig. 2, the direction which the roots take is represented ascending upward and permeating the mound throughout. It will be noticed that the surface exposure to air is greatly increased by throwing the earth up into mounds, as shown, and the roots readily find their way to an appropriate point or distance below the surface in all directions.

C C, &c., represent boxes for incasing the limbs, as has been stated. They are made of any convenient size appropriate to the dimensions of the tree where they are to be used, and are arranged appropriately around the tree in sufficient number to receive all the clusters of branches. Their outer ends rest upon the ground, while the other ends, which extend nearly to the body of the tree, are supported by stakes *b*. These enter the mound to any convenient depth, so that the end of the box is supported at a suitable height to receive the clusters of branches.

*c c*, &c., represent a covering of straw or any suitable material placed on or wrapped around the limbs. This should be kept as dry as possible, as moisture augments the chances of disaster to fruit in many ways. The limbs should be incased in the boxes in November, and remain inclosed, if in the latitude of, say, southern Ohio, until April. This will retard vegetation and secure the crop against the dangers from late spring frosts.

Having fully described my invention, what I claim as new, and desire to secure by Letters Patent of the United States, is the following:

1. The process or treatment of fruit-trees, including the mode of planting, mounding, and trimming, substantially as herein described.

2. In combination with the mounds A A, &c., and the process, substantially as herein described, the use of the boxes B B, &c., arranged as and for the purpose set forth.

ISAAC BOLMER.

Witnesses:
W. L. SCHENCK,
PETER Y. GEBHART.